(No Model.)
G. W. CADY.
VETERINARY DRENCHING TUBE.
No. 382,688. Patented May 15, 1888.
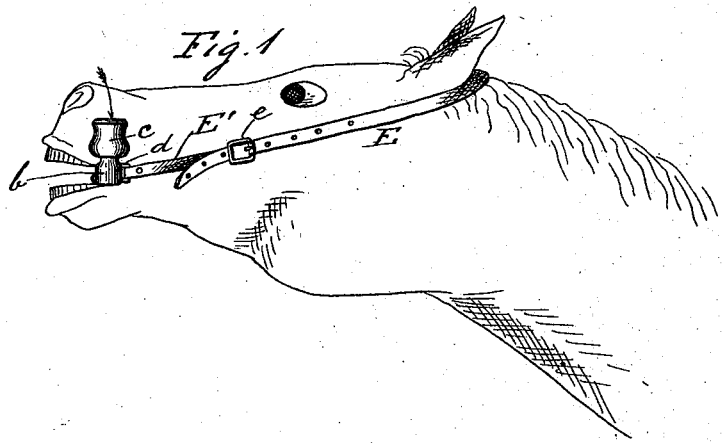
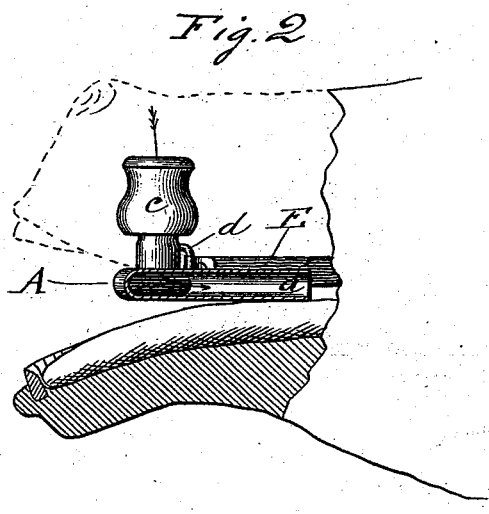
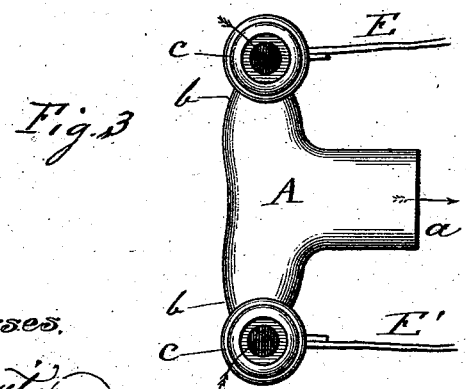
Witnesses.
W. Rossiter
Otto Lubkert
Inventor
George W. Cady
by Wm. H. Lotz
Atty.

UNITED STATES PATENT OFFICE.

GEORGE W. CADY, OF CHICAGO, ILLINOIS.

VETERINARY DRENCHING-TUBE.

SPECIFICATION forming part of Letters Patent No. 382,688, dated May 15, 1888.

Application filed August 1, 1887. Serial No. 245,888. (No model.)

*To all whom it may concern:*

Be it known that I, GEORGE W. CADY, a citizen of the United States of America, residing at Chicago, in the county of Cook and State of Illinois, have invented certain new and useful Improvements in Veterinary Drenching-Tubes, of which the following is a specification, reference being had therein to the accompanying drawings.

This invention has for its object to provide a device by which a single person can make a horse swallow medicine, that before required three men to accomplish, and with which a horse or other animal is sure to get the full dose of medicine prescribed, he not being able to spawl the medicine, but must drench it down; and with that object in view my invention consists of the novel devices and combinations of devices hereinafter described and specifically claimed.

In the accompanying drawings, Figure 1 represents a side view of a horse's head with my apparatus applied; Fig. 2, a longitudinal vertical section through the center line of the apparatus, showing its position in the horse's mouth; and Fig. 3 is a plan view of the apparatus.

Corresponding letters in the several figures of the drawings designate like parts.

A denotes the apparatus, being a T-shaped tubular casting, somewhat flattened for a more ready insertion into the horse's or other animal's mouth, the middle shank, $a$, of this tube being open, and the side shanks, $b$, being closed at their ends, and being provided with cup-shaped funnels $c$, that communicate with the tubular channels in casting A. A loop, $d$, is formed or fixed to each side shank, $b$, for attaching a leather strap, E E', the end of one of which being provided with a buckle, $e$, and the end of the other having eyes for either to engage the tongue of buckle $e$.

This apparatus being inserted into a horse's or other animal's mouth, with the tube $a$ resting upon the tongue of the animal, and the cups $c$ projecting from each side of the animal's mouth, the straps E E' are passed around his head behind the ears, and are secured by buckle $e$, so as to hold the apparatus rigidly in position, similar to a bridle-bit. Now by pouring the medicine into either cup and then pushing up the horse's head the horse cannot otherwise than drench the medicine down, because with holding his tongue down by tube $a$ his throat is wide open, and while medicine is thus applied through one cup atmospheric air can enter through the other cup, whereby the drenching of the medicine is facilitated. After thus feeding in the medicine water can be poured into the cup for washing the remaining medicine down into the horse's throat and for washing out the horse's mouth before removing the drenching-tube.

Instead of tube $a$, other attachments may be applied for holding the animal's tongue down.

I am aware that Letters Patent No. 104,416 were issued to H. A. Brandes on June 21, 1870; but in these, a single cup, $c$, only being shown and described, into which the medicine is to be poured, no air-vent is provided, that is essential for the proper operation of an apparatus of this sort, such air-vent relieving the horse and preventing back-pressure, and thereby making drenching more easy. In my apparatus either cup $c$ will act as an air-vent, while the other cup is filled with the medicine.

What I claim is—

An apparatus for the purpose described, consisting of a T-shaped tube, A, provided with an opening, $a$, and with cups $c$ to both ends, all as shown and described.

In testimony whereof I affix my signature in presence of two witnesses.

GEORGE W. CADY.

Witnesses:
WILLIAM H. LOTZ,
OTTO LUBKERT.